(12) United States Patent
Seack

(10) Patent No.: US 11,084,565 B2
(45) Date of Patent: Aug. 10, 2021

(54) PANEL STRUCTURE AND ASSOCIATED METHOD

(71) Applicant: Airbus Operations GmbH, Hamburg (DE)

(72) Inventor: Oliver Seack, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 341 days.

(21) Appl. No.: 15/999,714

(22) Filed: Aug. 20, 2018

(65) Prior Publication Data

US 2019/0031314 A1 Jan. 31, 2019

Related U.S. Application Data

(63) Continuation of application No. 14/883,897, filed on Oct. 15, 2015, now Pat. No. 10,086,923.

(30) Foreign Application Priority Data

Oct. 16, 2014 (EP) ..................................... 14189185

(51) Int. Cl.
*B64C 1/06* (2006.01)
*B64C 1/10* (2006.01)
(Continued)

(52) U.S. Cl.
CPC ................ *B64C 1/064* (2013.01); *B64C 1/10* (2013.01); *B64C 1/12* (2013.01); *B64C 3/22* (2013.01);
(Continued)

(58) Field of Classification Search
CPC .......... B64C 1/061; B64C 1/064; B64C 1/12; B64C 3/18; B64C 3/183; B64C 3/20; B64C 9/00; B64C 9/32; B64C 9/323
See application file for complete search history.

(56) References Cited

U.S. PATENT DOCUMENTS 2,311,683 A * 2/1943 Naugle ..................... B64C 3/22
244/123.7
6,343,452 B1 2/2002 Holden
(Continued)

FOREIGN PATENT DOCUMENTS

CN 101977811 2/2011
CN 102282069 12/2011
(Continued)

OTHER PUBLICATIONS

European Search Report, dated Mar. 3, 2015.
(Continued)

*Primary Examiner* — Michael H Wang
(74) *Attorney, Agent, or Firm* — Greer, Burns & Crain, Ltd.

(57) ABSTRACT

A panel structure for a vehicle, and especially for an aircraft or spacecraft, includes an area member, especially a skin member, that defines an areal expanse with a first surface and an opposite second surface and having a thickness between the first and second surfaces; and a plurality of elongate stiffener members which are attached to the area member and extend over at least one of the first and second surfaces; wherein at least one of the stiffener members is bifurcated at a bifurcation point into two or more branch stiffener members.

20 Claims, 14 Drawing Sheets

(51) Int. Cl.
  *B64C 1/12* (2006.01)
  *B64C 3/22* (2006.01)
  *B64G 1/22* (2006.01)
  *B33Y 10/00* (2015.01)
  *B33Y 80/00* (2015.01)

(52) U.S. Cl.
  CPC ............... *B64G 1/22* (2013.01); *B33Y 10/00* (2014.12); *B33Y 80/00* (2014.12)

(56) References Cited

U.S. PATENT DOCUMENTS

| | | | |
|---|---|---|---|
| 8,245,971 B2* | 8/2012 | Makela | B64C 3/187 244/123.12 |
| 2004/0145080 A1* | 7/2004 | Tanaka | B64C 9/00 264/257 |
| 2008/0035788 A1* | 2/2008 | Kothera | B64C 9/00 244/99.8 |
| 2010/0133382 A1* | 6/2010 | Pahl | B64C 3/22 244/120 |
| 2010/0320324 A1 | 12/2010 | Dittmar et al. | |
| 2010/0320331 A1* | 12/2010 | Vallee | B64C 25/16 244/198 |
| 2011/0017870 A1 | 1/2011 | Gallant | |
| 2012/0132751 A1* | 5/2012 | Groves | B64C 3/22 244/123.12 |
| 2012/0245862 A1 | 9/2012 | Coudouent et al. | |
| 2013/0075529 A1 | 3/2013 | Marcoe | |
| 2014/0015172 A1 | 1/2014 | Sidhu et al. | |
| 2017/0233061 A1 | 8/2017 | Seis | |
| 2017/0240299 A1* | 8/2017 | Conversano | B64C 3/26 |
| 2018/0086429 A1* | 3/2018 | Sheppard | B64C 9/00 |

FOREIGN PATENT DOCUMENTS

| | | |
|---|---|---|
| CN | 102481973 | 5/2012 |
| CN | 103038770 | 4/2013 |
| DE | 3844080 | 7/1990 |
| DE | 102009057018 | 6/2011 |
| WO | 9730236 | 8/1997 |
| WO | 2010082047 | 7/2010 |
| WO | 2012131327 | 10/2012 |
| WO | 2016023056 A1 | 2/2016 |

OTHER PUBLICATIONS

Chinese Office Action, dated May 4, 2017, Priority Document.
Chinese Office Action, dated Dec. 7, 2017, Priority Document.
Xiaoyi Chen at al., Ten thousand mystery of the world (Biology), 1995, 85-86.

* cited by examiner (a) Prior Art  (b) Prior Art  (c)

bifurcations at distributed radial positions r

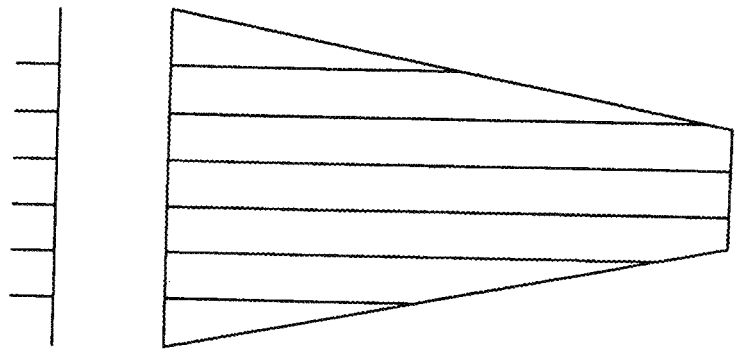
Fig. 19  a) Prior Art   b)
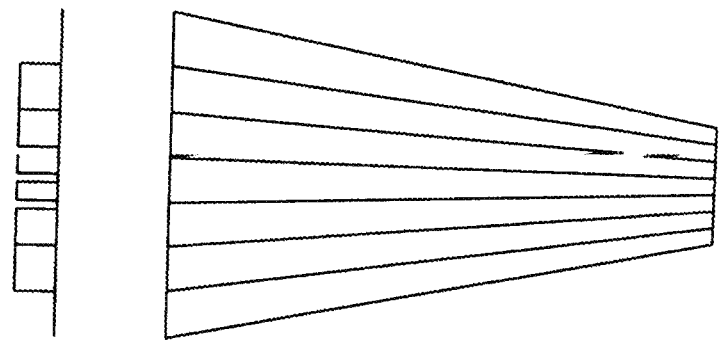
Fig. 20  a) Prior Art   b)
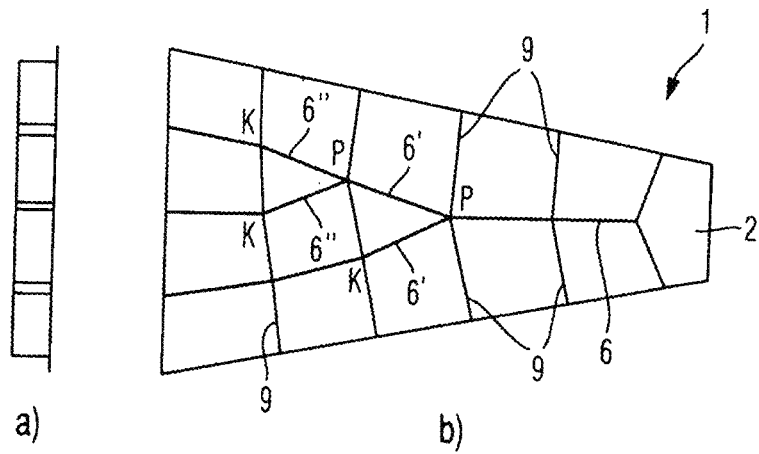
Fig. 21  a)   b)

PANEL STRUCTURE AND ASSOCIATED METHOD

CROSS-REFERENCES TO RELATED APPLICATIONS

This application is a continuation of U.S. patent application Ser. No. 14/883,897 filed on Oct. 15, 2015, which claims the benefit of the European patent application No. 14189185.3 filed on Oct. 16, 2014, the entire disclosures of which are incorporated herein by way of reference.

FIELD OF THE INVENTION

The present invention relates to a new panel structure for a vehicle, especially for an aircraft or a spacecraft, and a new method for producing such a panel structure, as well as to a vehicle that includes such a panel structure.

BACKGROUND OF THE INVENTION

Although this invention is especially designed for use in the aircraft and aerospace industries, it will be appreciated that it may also be employed in nautical and land vehicle applications, such as rail and/or automotive applications.

In the aircraft and aerospace industries, stiffened panels, and especially stringer-stiffened panels have become standard as a light-weight construction solution. Indeed, typically more than 90% of the fuselage or the outer "skin" of modern passenger aircraft is designed as stringer-stiffened panels. In this regard, a "stringer" is a stiffening member which increases the out-of-plane bending stiffness of a structural panel or area member. With stringers, a panel is reinforced against global buckling under compression and shear loading. The resulting instability and collapse loading of the panel member is thereby shifted to higher loading with a lower structural weight penalty compared to simply thickening the panel member itself. Stringers also limit the dimensions of any buckling in the panel member or skin to localized regions between the stringers (i.e., the "skin bays"), to provide so-called local buckling. By reducing buckling field dimensions (i.e., the size of the skin bays), the buckling strength of the panel member or skin is increased.

While design efforts are continually directed to reducing the mass of an aircraft in order to optimize fuel consumption, it nevertheless remains critical that strength and safety of the aircraft structure is not compromised and that the testing standards are still met.

SUMMARY OF THE INVENTION

A new and improved panel structure for a vehicle, and particularly an aircraft, is therefore devised that can satisfy current safety and testing standards yet also enable a lower mass construction.

According to one aspect, therefore, the invention provides a panel structure for a vehicle, and especially for an aircraft or spacecraft, comprising: an area member, such as a panel member or skin member; and a plurality of elongate stiffener members which are attached to the area member and extend over at least one of side thereof; wherein at least one of the plurality of stiffener members is branched or bifurcated at a branch point or a bifurcation point into two or more branch stiffener members. Typically, the area member has an areal expanse and comprises a first side and an opposite second side, with a thickness of the area member defined between the first and second sides. The stiffener members are attached to the area member and extend over at least one of the first and second sides thereof.

In this way, the invention provides a new and improved panel structure which employs branching, especially bifurcation, of the stiffener members to modify a spacing or pitch of the stiffener members in a region of the area member or panel member which is exposed to higher loading in use. That is, by branching or bifurcating the stiffener member into at least two branch stiffener members, it becomes possible to increase the stiffener density (i.e., reduce the spacing or pitch of the stiffener members) in that region of the area member or panel member. Thus, it will be appreciated that the invention contemplates that a stiffener member may be divided into more than two branch stiffener members (e.g., via "trifurcation" or "quadfurcation"). But for simplicity, the term "bifurcated" and variations thereof, such as "bifurcation," used herein shall be understood as a reference to a division or branching of a member into two or more branch members, rather than as being limited to only two branch members. Whereas localized strengthening for non-uniform loading of a panel structure has conventionally been provided by localized thickening of the area member or panel member, the present invention provides a lower weight and more economical design approach. In particular, use of bifurcated stiffener members (e.g., stringers) offers greater freedom in the design of a stiffened panel structure with relatively little additional weight. It will be noted that the term "area member" in this disclosure is a general term for a member, such as a panel, skin or sheet, presenting a relatively large areal expanse between opposite surfaces or sides thereof compared to a thickness dimension between those surfaces or sides.

In conventional panel structure design, a uniform pitch of the stiffener members (e.g., stringers) will usually be fixed at an early design phase. If a skin bay between the stringers experiences buckling in the conventional design process, the skin thickness of the affected skin bays is then increased. However, increasing skin thickness to prevent buckling is much less efficient than applying stiffeners. This is due to the different, non-linear relationship between the buckling strength of the skin member in local buckling and the buckling strength of the stiffeners against global buckling. A local buckling strength of the skin scales with the second power of its thickness, whereas the global buckling strength of a stiffener typically scales with the third power of a height of the stiffener. As the thickness of the skin is usually small compared to the height of the stiffener, one must add considerably more mass to the skin to prevent buckling compared with the stiffeners. Thus, the bifurcated stiffener members in the panel structure of the invention provide a practical new light-weight panel structure design.

In one embodiment of the invention, an angle of bifurcation between the branch stiffener members decreases as the branch stiffener members extend away from the bifurcation point. In other words, the branch stiffener members desirably diverge less as they extend away from the bifurcation point and may follow a path in which, after the bifurcation, the branch stiffener members then extend approximately parallel to one another. To this end, at least one of the two branch stiffener members, and optionally both of them, may extend through a bend or a kink to reduce or decrease the angle of bifurcation as the branch stiffener members extend away from the bifurcation point. In particular, the bend or kink of the at least one branch stiffener member is preferably through a predetermined angle back towards the other of the two branch stiffener members. This change in the path or direction of the branch stiffener members after the initial bifurcation serves to smooth a transition between the different spacings or pitches of the stiffener members and/or branch stiffener members.

In another embodiment, each of a plurality of the stiffener members on the area member is branched or bifurcated into at least two branch stiffener members at a respective branch point or bifurcation point. The respective branch points or bifurcation points are therefore preferably distributed or offset with respect to one another, especially in a radial direction. The distributed or offset positions of the branch points or bifurcation points serve to provide a generally smooth transition from one stringer spacing or pitch in one region of the panel structure to another stringer spacing or pitch in an adjoining region of the panel structure.

In yet another embodiment, the stiffener members and branch stiffener members are arranged to provide an approximately uniform pitch or spacing between adjacent stiffener members and/or adjacent branch stiffener members in a local region of the panel structure.

In a further embodiment of the invention, the area member (i.e., panel member or skin member) of the panel structure has a rounded configuration, as is typically found in a pressure bulkhead of an aircraft fuselage, or a tapered configuration, or a generally rectangular configuration. In this regard, the panel structure is particularly suitable for panels having non-uniform internal loads and/or panels having non-uniform or concentrated external loads.

In a further embodiment, the panel structure may comprise a part of a structural component and may, for example, include the plurality of stiffener members arranged between and attached to two or more area members or panel members, such that the stiffener members form a reinforcing framework or structure, which is enclosed and/or covered by the respective area members or panel members.

According to another aspect, the present invention provides a method of producing a panel structure for a vehicle, such as an aircraft or spacecraft, comprising:

providing an area member, and especially a panel member or skin member, that defines an areal expanse having a first surface and an opposite second surface, with a thickness of the area member between the first and second surfaces; and arranging a plurality of elongate stiffener members extending over at least one of the first and second surfaces of the area member for attachment to the area member;

wherein the step of arranging the stiffener members comprises branching or bifurcating at least one of the stiffener members at a branch point or bifurcation point into two or more branch stiffener members.

In one embodiment, a position or location on the area member of the branch point in the at least one stiffener is selected or determined based on: a buckling threshold of a region of the area member adjacent the at least one stiffener member and a required minimum design load for the area member in that region; and/or a maximum allowable longitudinal force in the at least one stiffener member.

As also discussed above, in a preferred embodiment the step of arranging the stiffener members comprises decreasing a branch angle or an angle of bifurcation between the branch stiffener members as the branch stiffener members extend away from the branch point. More particularly, the step of arranging the stiffener members may include extending or directing at least one of the branch stiffener members, and optionally both, through a bend or kink to reduce the branch angle or bifurcation angle as the branch stiffener members extend away from the bifurcation point.

In a further embodiment of the invention, the step of arranging the stiffener members comprises bifurcating each of a plurality of the stiffener members at a respective bifurcation point into at least two branch stiffener members. The method may then preferably further comprise: distributing or offsetting the bifurcation points with respect to one another; for example, offsetting the bifurcation points from one another in a radial direction.

In another embodiment, the step of arranging the stiffener members comprises digital modelling with respect to positions of the stiffener members. The method of producing the panel structure preferably includes an Additive Layer Manufacturing (ALM) technique, which provides high design flexibility with respect to geometric constraints. In this regard, ALM may be used to deposit and build up both the area member itself and the stiffener members which are fixed to and extend over at least one surface or side of the area member in an integral or unitary construction; e.g., based upon a digital model of the panel structure. In an alternative embodiment, the panel structure stiffener members may be deposited and built up on, and attached to, a pre-formed area member. The method of producing the panel structure need not necessarily employ ALM techniques and may comprise other manufacturing steps, such as milling, casting, riveting, welding, as well as techniques for composite materials (e.g., fiber-reinforced polymer FRP composites) joined by bonding and/or fastening.

According to a further aspect, the present invention provides a vehicle, such as an aircraft or spacecraft, having at least one panel structure, and preferably several, according to any one of the embodiments described above.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which:

FIG. 19 is an example of a state-of-the-art tapered panel structure, shown in end view (a) and plan view (b), with a conventional parallel stiffener layout.

FIG. 20 is an example of a state-of-the-art tapered panel structure, shown in end view (a) and plan view (b), with a conventional concentric stiffener layout.

FIG. 21 is an embodiment of a tapered panel structure of the invention, shown in end view (a) and plan view (b), with a bifurcated stiffener layout.

DETAILED DESCRIPTION OF THE PREFERRED EMBODIMENTS

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
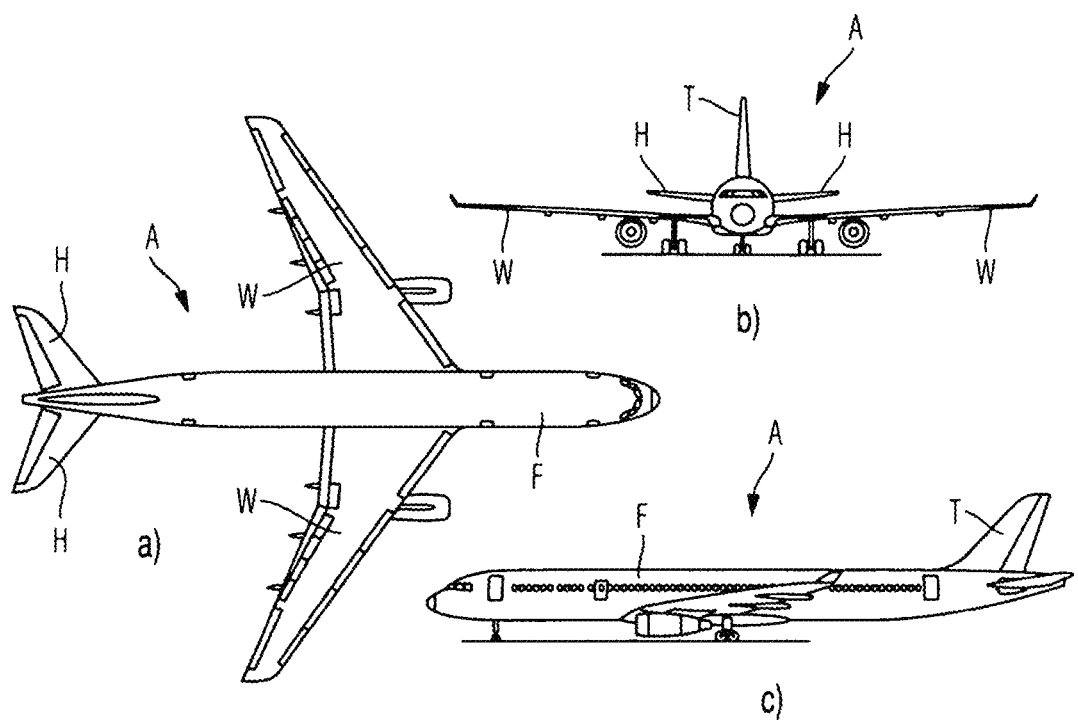
FIG. 1 shows (a) a plan view, (b) front view, and (c) side view of an aircraft showing suitable areas (darker or shaded) for a panel structure according to the invention; namely, over 90% of a fuselage or outer skin of modern passenger aircraft includes stringer stiffened panels.
Figure 2:
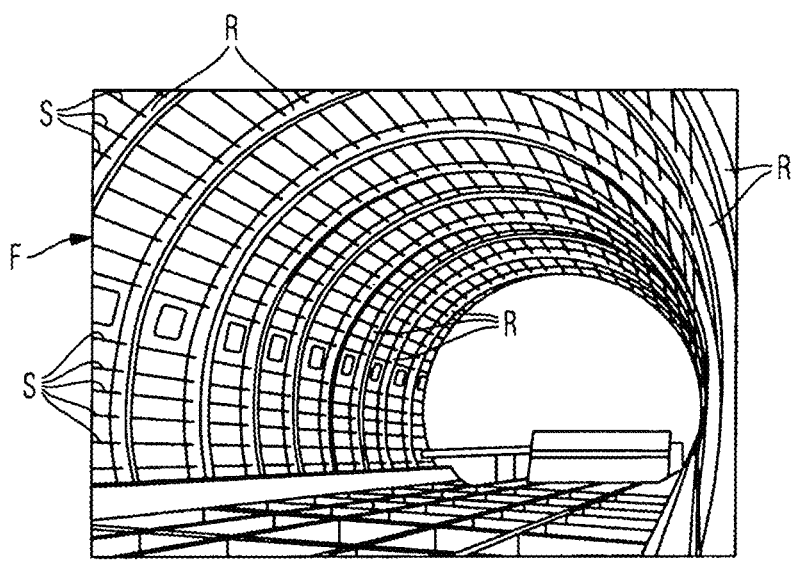
FIG. 2 shows an example of a typical aircraft fuselage design with frames and stringers.
Figure 3:
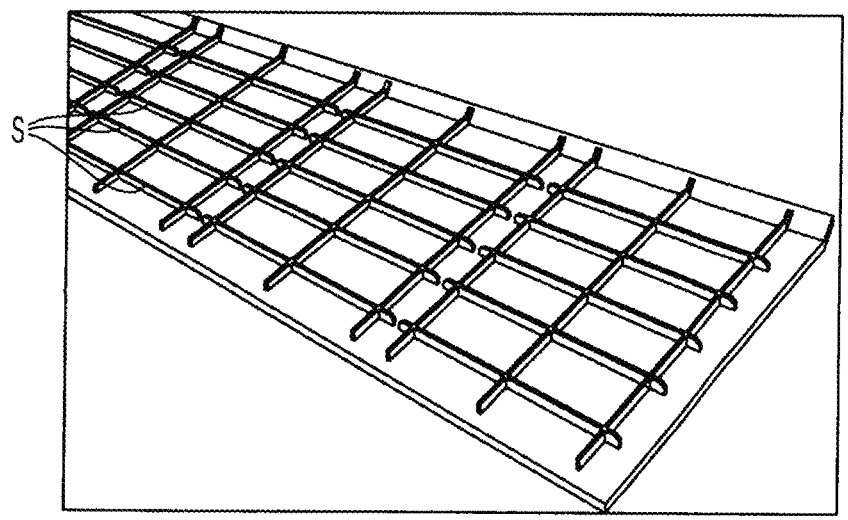
FIG. 3 is an example of a rectangular stringer-stiffened panel structure with a typical stringer pattern.
Figure 4:
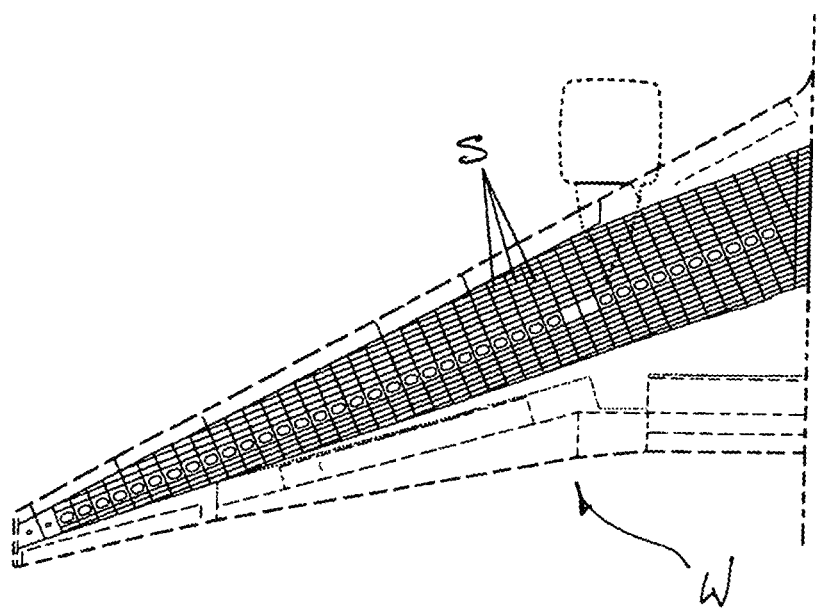
FIG. 4 shows an example of a tapered panel structure with parallel stringers found in a wing.
Figure 5:
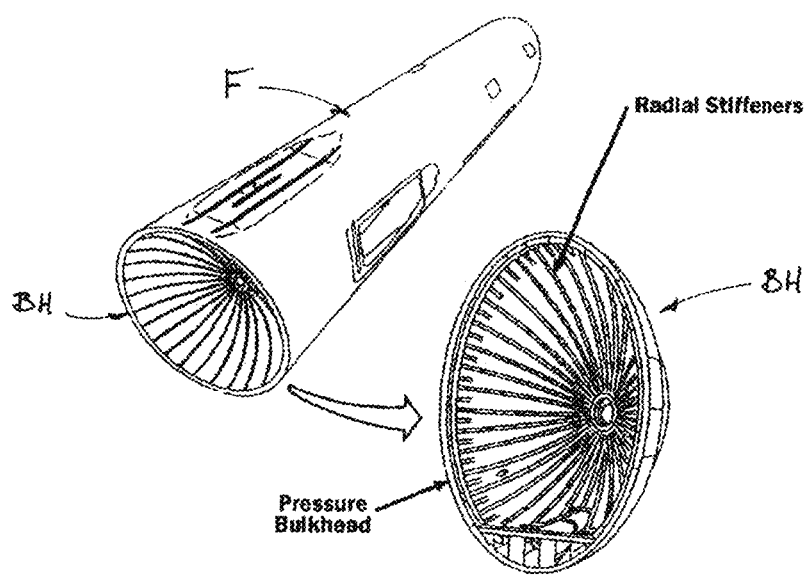
FIG. 5 shows an example of a round and spherically curved stiffened panel structure for a pressure bulkhead inside an aircraft fuselage.

With reference first to FIG. 1 of the drawings, a commercial passenger aircraft A having a fuselage F, wings W, vertical tail-plane T and horizontal tail-plane H is illustrated. More than 90% of the outer skin of the aircraft A is designed as and comprised of stiffened panels, as illustrated in FIG. 2. In particular, the outer skin panel members are stiffened by parallel and longitudinally extending stringer members S and circumferentially extending frame members or ribs R. Further, inner panel structures of the aircraft A are typically also designed as stringer-stiffened panels. For example, these may include panel structures of the wings W including spars and ribs, or parts of the vertical and horizontal stabilizers or tail-planes T, H, in addition to flaps and ailerons, and/or a pressure bulkhead BH inside the fuselage F. FIGS. 3 to 5 of the drawings show examples of such types of panel structures. Accordingly, a panel structure of the present invention is suitable for use in a wide range of different applications in the aircraft industry.

Figure 6:
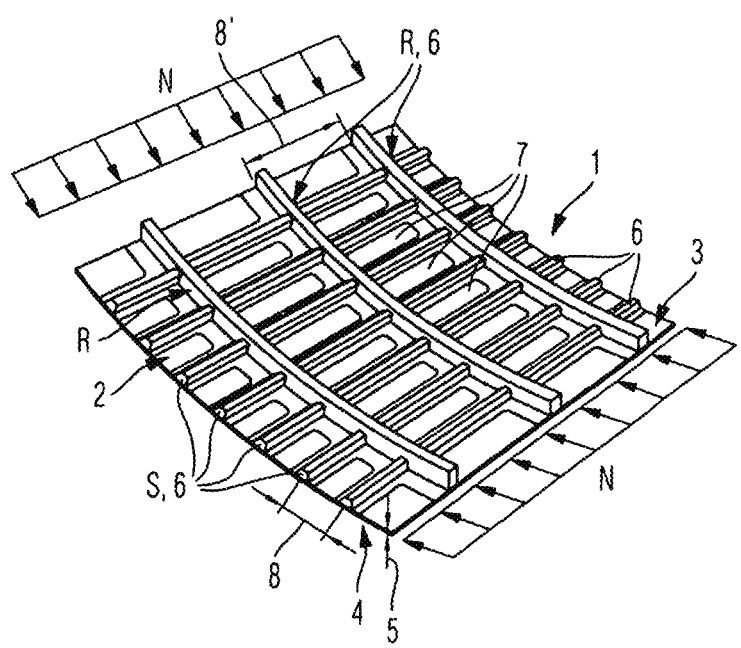
FIG. 6 is a schematic perspective view of a conventional stringer-stiffened panel structure with a typical assumed constant loading.

With reference to FIG. 6 for example, a conventional panel structure 1 comprises a panel member or skin member 2 having a relatively large areal expanse over a first (i.e., an inner) side or surface 3 thereof and an opposite second (i.e., outer) side or surface 4 of the area or skin member 2 compared to a relatively small thickness 5. This panel structure 1 may, for example, comprise a portion of a curved aircraft fuselage F. The inner side 3 of the skin member 2 comprises a plurality of elongate stiffener members 6 attached to the skin member 2 for reinforcing same, whereas the opposite outer side 4 of the panel or skin member 2 remains generally smooth. The stiffener members 6 include stringers S (e.g., hat-stringers or cap-stringers) which extend longitudinally and frame members or ribs R which extend transversely. The localized regions or sections of the skin member 2 surrounded by the stiffener members 6 (i.e., between the stringers S and the ribs R) are referred to as panel "bays" or skin "bays" 7.

Figure 7:
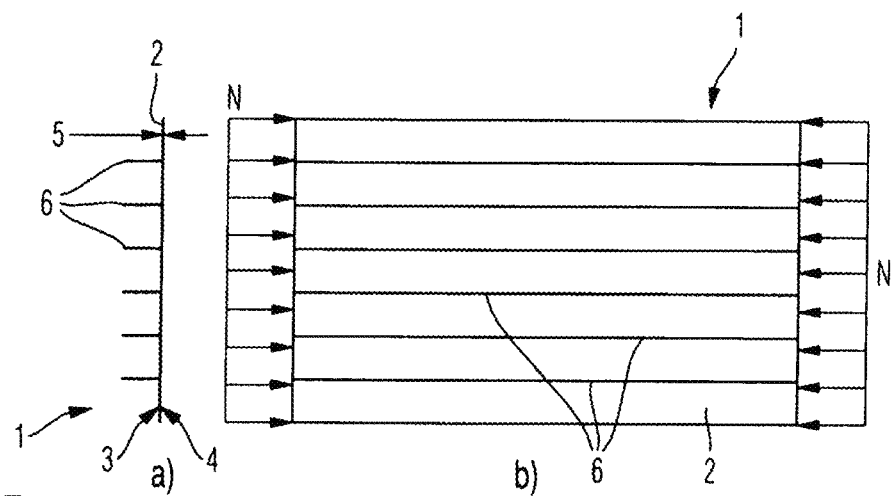
FIG. 7 is an idealized conventional rectangular stringer-stiffened panel structure shown in end view (a) and plan view (b). The uniform loading (arrows) results in uniform stringer pitch combined with uniform skin thickness. The panel is optimized for this type of loading by keeping the stringer pitch and skin thickness uniform.
Figure 8:
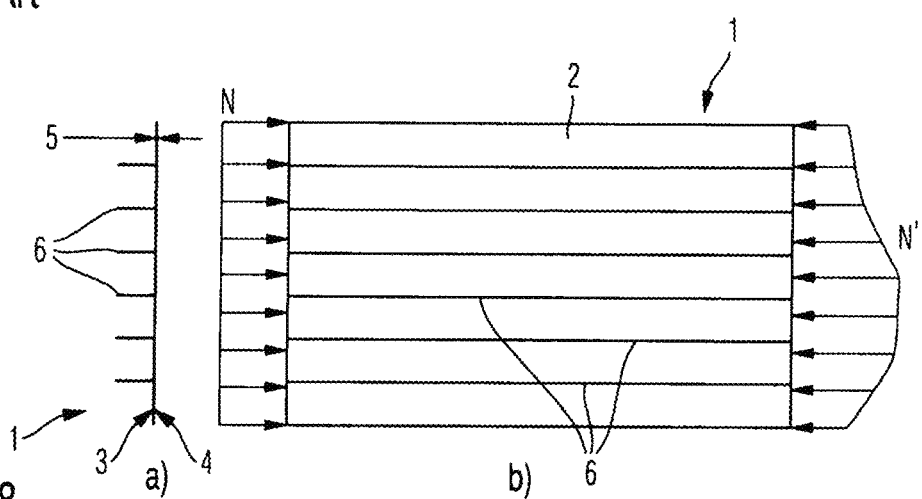
FIG. 8 is an example of a rectangular stringer-stiffened panel structure, shown in end view (a) and a plan view (b), of conventional form with a real-world non-uniform loading on its right edge. (Note: For clarity, shear along the long panel edges resulting from the disequilibrium of the loading on the left and right short panel edges is not shown.)

During conventional design of a panel structure 1, a uniform pitch or spacing 8, 8' of the stiffener members 6 (e.g., ribs or stringers) will usually be fixed at an early design phase. If not driven by other constraints, such as window spacings in fuselage panels 2, the constant pitch 8 of the stringers results from simplified assumptions for load distributions acting on stringer stiffened panel structures 1 (see FIG. 7). For example, a constant line-load N distributed along an edge of the panel member 2 is normally assumed. Such assumptions are made to establish generic tests with reasonable effort and sizing methods, which are applicable in general to all kinds of panels under different loadings. At best, the loads are assumed to vary linearly (increasing or decreasing) to cover bending effects or loads varying over length. In real-life aircraft panel structures 1, such as fuselages, wings, and the like, the loading N' of a stringer-stiffened panel 2 along an arbitrary cross-section is much more complex. That is, the loading is neither uniform nor does it vary linearly along a cross-section. A more realistic loading N' is shown in FIG. 8 along the right edge of the panel structure 1.

Figure 9:
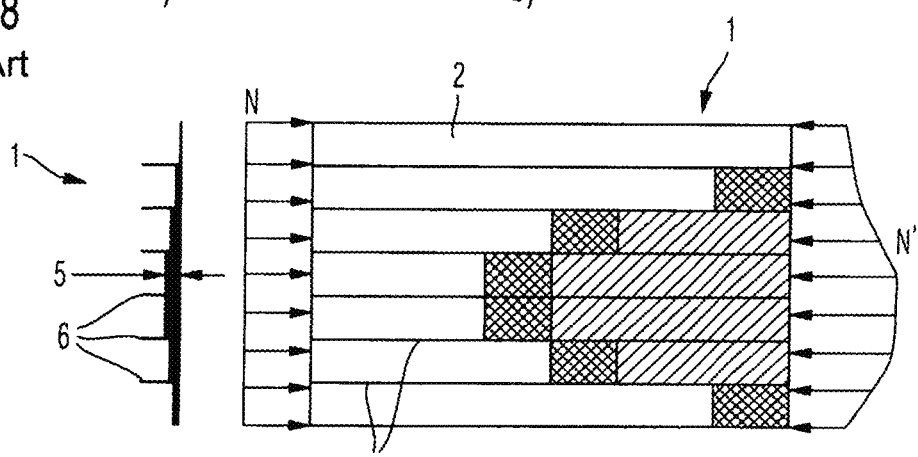
FIG. 9 is an example of a rectangular state-of-the-art stringer-stiffened panel structure with non-uniform loading. This panel structure has uniform stringer pitch but varying, non-uniform skin thicknesses to prevent buckling.

Thus, conventional panel design processes for stiffened panel structures 1 with standard sizing and manufacturing methods only provide a compromise with a uniform stringer pitch 8 and a constant cross-section for the complete panel structure 1. The defined uniform pitch 8 of the stringers 6 and constant cross-section of this method are applied to all parts of the panel structure 1 although it is clear that these pre-defined parameters can only be optimized for one loading situation in a single cross-section of the panel. If the stringer pitch or spacing 8 is not sufficiently small to prevent local buckling of the skin 2 in the conventional design process, a thickness 5 of the skin or panel member 2 will be increased locally, as represented by the shading in FIG. 9, where darker shading shows greater thickness.

The mechanical property that prevents buckling of a structure is its ability to withstand bending. The ability to withstand bending or buckling scales differently, respectively, for the local buckling of a panel member or skin member in a panel bay or skin bay compared with global buckling of a stringer. Buckling theory describes the ability of a skin to withstand buckling by the critical stress $\sigma_{crit,skin}$. If the stress in the panel member is higher than this value, the panel buckles.

The critical stress $\sigma_{crit,skin}$ scales with the squared thickness of the skin $t_{skin}$:

$$\sigma_{crit,skin} \sim t_{skin}^2 \qquad (1)$$

The buckling onset of the stringers, on the other hand, scales with the third power of the stringer height $h_{stringer}$:

$$\sigma_{crit,stringer} \sim h_{stringer}^3 \qquad (2)$$

As the effect on preventing buckling by increasing the skin thickness is therefore so much smaller than by increasing the structural height of a stringer, increasing the thickness of the skin is a less weight-efficient way to prevent the skin from buckling. In other words, conventional solutions which increase the skin thickness to prevent local buckling of the skin, do not benefit from a minimum possible weight.

The panel structure 1 of the present invention avoids these constraints by employing a stiffener (stringer) layout that has been inspired by a biological solution found in the Giant Water Lily (*Victoria amazonica* and *Victoria cruziana*). This design may, in turn, be combined with the design freedom of recent manufacturing technologies from the group of Additive Layer Manufacturing (ALM) techniques, such as Selective Laser Sintering (SLS) and Selective Laser Melting (SLM). Therefore, panels designed and manufactured according to the invention can have a lower weight and also reduced recurring costs, as ALM techniques allow manufacturing of highly integrated parts reducing assembly effort.

Figure 10:
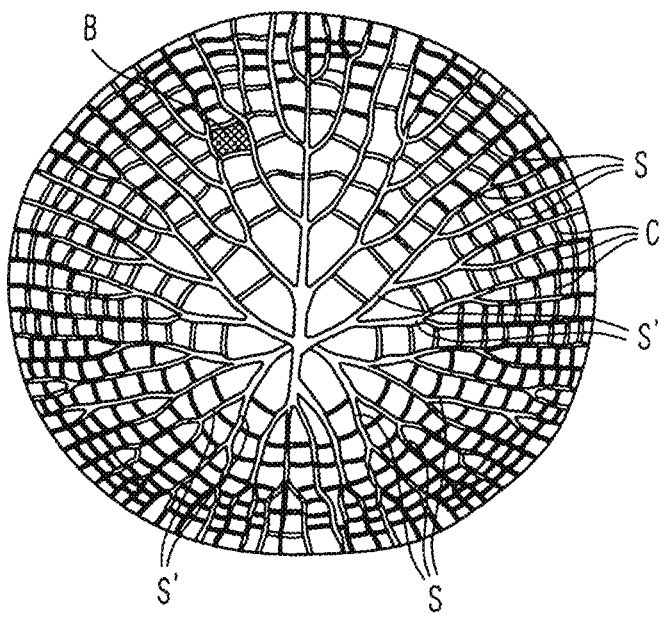
FIG. 10 shows a pattern of stiffening elements on a bottom side of a giant water lily *Victoria cruziana* leaf.

FIG. 10 of the drawings shows the underside of a leaf of the Giant Water Lily (*Victoria cruziana*), which is stiffened by an arrangement of generally radially directed stringers S and circumferentially orientated smaller intercostals C. The main stringers S and the intercostals C surround or enclose nearly quadratic zones or bays B of the planar, skin-like part of the leaf. The main stringers S commence at a central point close to a center of the leaf and spread out in a radial direction towards an edge of the leaf A circumferential distance between neighboring stringers S therefore increases with increasing distance from the leaf center. However, it appears that once the circumferential distance between two main stringers S exceeds a certain value, the main stringers bifurcate into two or more branch stringers S' to keep the distance between the stringers S, S' within certain limits. It is considered that bifurcation of its main stringers S helps the plant control the area of each skin bay B. That is, the Giant Water Lily locally adapts a pitch or spacing of its stiffener members S, S' to its specific needs in respect of metabolism and structural loading. This helps the Giant Water Lily to maximize energy harvesting from the sunlight with a minimum expense of energy and material to build up the leaves. And considering the relative low strength and elastic moduli of plant fibers compared to technical materials, the stiffness of the leaf is astonishing.

Thus, a key feature of a panel structure 1 according to the present invention concerns the use of stiffener bifurcation to control the (local) buckling field size. In particular, the panel design of the invention adapts the size of a skin bay 7 (i.e., the buckling field) in order to prevent buckling and adopts a skin thickness 5 only to satisfy the strength or stiffness requirements. In the proposed design, this is done by varying a size of the buckling field or skin bay 7 locally from bay to bay to fulfil the buckling requirements in each region without increasing the skin thickness. Instead, the number of stiffener members 6 in the affected region of the panel member 2 is increased. In a transition zone between a region of the panel member 2 having a lower stiffener density and a region of the panel member 2 having a higher stiffener density, the stiffener members 6 can bifurcate similar to the main stringers S of the Giant Water Lily leaf.

Figure 11:
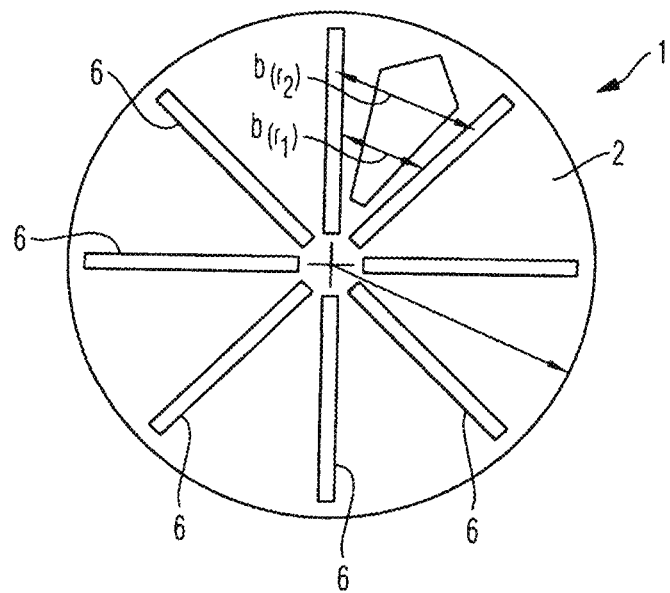
FIG. 11 is an example of a circular or spherical stringer-stiffened panel with straight radial stringers. The buckling field width b varies over radius r.
Figure 12:
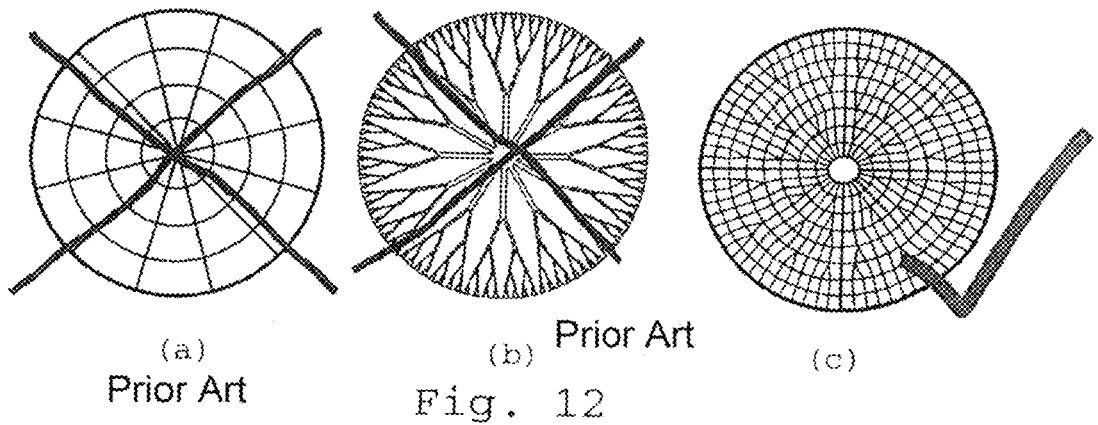
FIG. 12 shows a comparison of different stiffener layouts for circular or spherical stringer-stiffened panel structures (a) classic pattern with straight radial (and circumferential) stiffeners, which produces an increasing buckling field size from the center to outer edge; (b) a pattern with simple bifurcated radial stiffeners which results in varying buckling field size from the center to outer edge; and (c) a stiffener layout according to an embodiment of the invention having bifurcated radial stringers with bifurcation points at different radial positions and kinked stiffeners after the bifurcation to keep the buckling field sizes generally uniform or as uniform as possible over the panel area.

To highlight the differences between a panel structure 1 of the invention having a stiffener layout inspired by the Giant Water Lily and panel structures with conventional, state-of-the-art stiffener layouts, reference is made to the drawing FIGS. 11 and 12.

FIG. 11 of the drawings shows a conventional stiffener layout for a circular or spherical shaped stringer stiffened panel. The stiffeners 6 themselves are straight and extend radially from a center of the panel 2 to the outer edge of the panel. This configuration produces a buckling field width b which varies with the radius r; i.e., $b(r_2) > b(r_1)$.

Drawing FIG. 12 compares panel structures 1 having different stiffener layouts. Each of the stiffener layouts (a) and (b) has a stringer pitch b that varies with radius r; i.e., b(r). Thus, the stringer pitch b(r) is not constant:

$$b(r) \neq \text{constant} \qquad (3)$$

In contrast, by applying the concept of the invention a panel structure 1 having a stiffener layout as shown in FIG.

12(c) can be achieved. With the exception of locations where one of the stiffeners 6 bifurcates and an innermost center of the panel 2, the pitch 8 of the radial stiffeners 6 is held more or less constant over the radius:

$$b(r) \approx \text{constant} \qquad (4)$$

Figure 13:
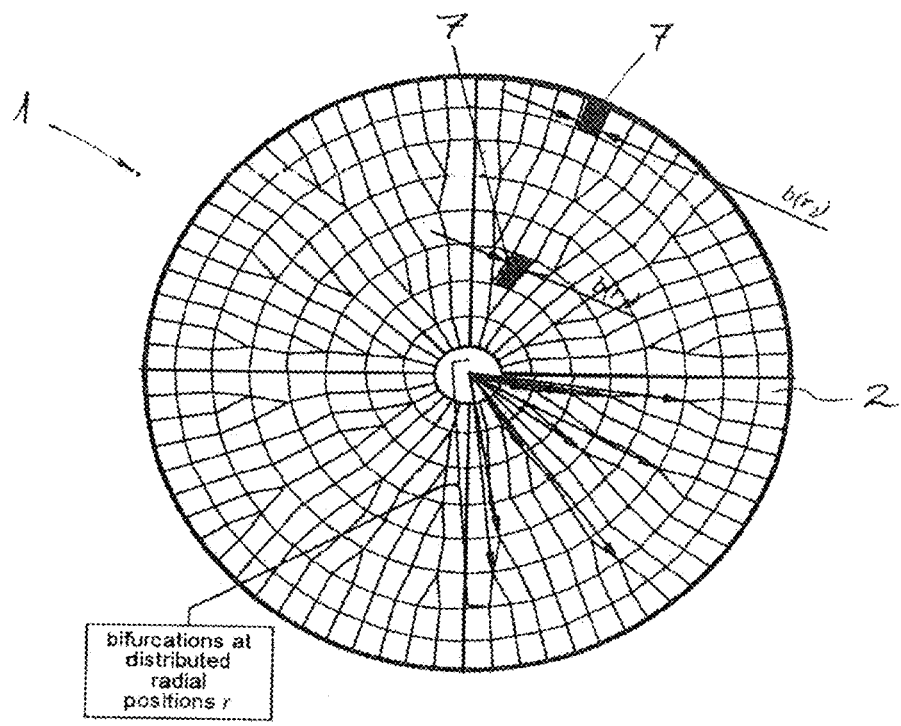
FIG. 13 is a sketch of a stringer layout on a circular or spherical panel structure of an embodiment with bifurcated radial stringers. The bifurcation points are located a different radial positions r and the bifurcated stringer pairs that stem from the bifurcation point are kinked towards one another to keep the buckling field width b as uniform as possible over the radius r. This results in more uniform buckling field sizes than in the stringer layouts shown in FIGS. 12 (*a*) and (*b*).

Furthermore, the bifurcation points P of the stiffeners 6 are not located at a common radius r, as shown for the principle in FIG. 12(b). Instead the positions of the bifurcations P have varying radii r. This principle can perhaps more clearly be seen with reference to FIG. 13. That is, the transition from one stringer pitch $b(r_1)$ to another stringer $b(r_2)$ can be smoothed and the stringer pitch $b(r)$ can be held roughly uniform with varying panel radius. Furthermore, the approx. quadratic panel bays or skin bays 7 (i.e., the local buckling fields) also remain approx. the same size with varying radius $r_1$ and $r_2$.

Figure 14:
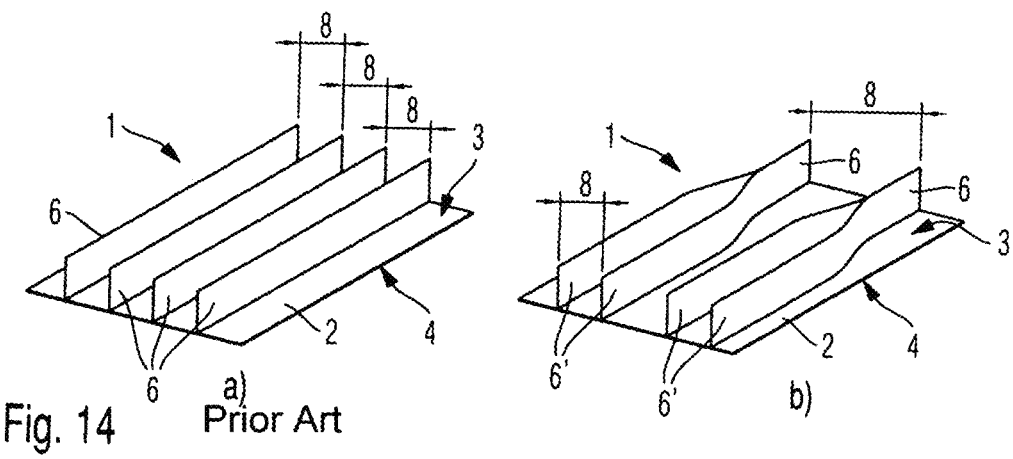
FIG. 14 is a schematic view of (a) a rectangular panel structure with conventional stringer layout having uniform stringer pitch, and (b) a rectangular panel structure with bifurcated stringer layout according to an embodiment of the invention.
Figure 15:
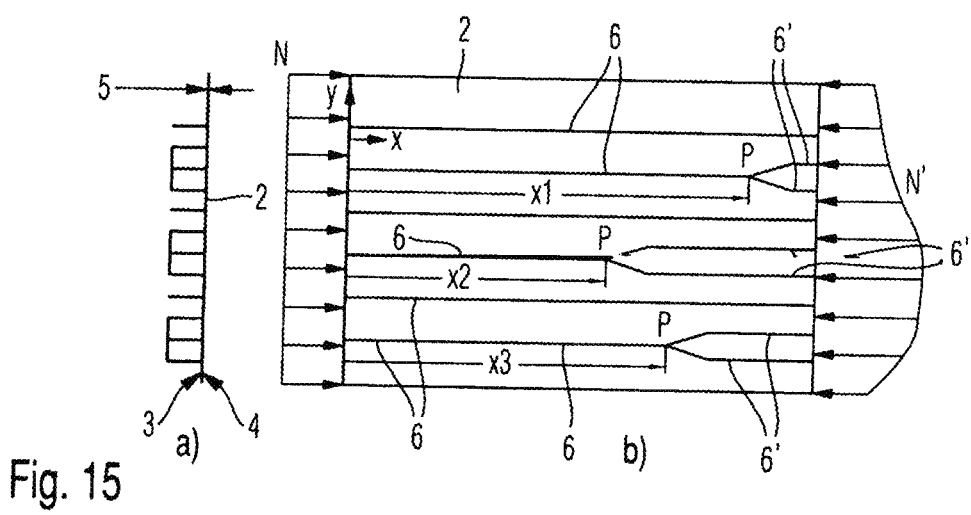
FIG. 15 is an example of a rectangular panel structure, shown in an end view (a) and a plan view (b), according to an embodiment of the invention with non-uniform loading and with a bifurcated stringer layout, with the bifurcations distributed or offset at different x-datums to maintain uniform thickness of the panel skin.

In addition to developing a panel structure 1 according to the invention with a circular or spherically curved stringer-stiffened panel member or skin member 2, the basic principle of a panel structure 1 having bifurcated stiffeners 6 can be employed for rectangular panels, as shown in FIGS. 14 and 15. Drawing FIG. 14 compares a conventional panel structure with stringers arranged having a uniform pitch in FIG. 14(a) with a sketch of a panel structure 1 according to an embodiment of the invention in FIG. 14(b) having bifurcating stringers 6. FIG. 15 shows a rectangular panel structure 1 according to an embodiment of the invention with non-uniform side loading N'. The panel structure 1 has stiffeners 6 (e.g., stringers) which extend longitudinally of the panel member 2, with three of the stringers 6 bifurcated at respective bifurcation points P into at least two branch stringers 6'. The bifurcation points P are distributed or offset from one another at different x-datums according to the local buckling strength required in order to maintain a uniform or constant thickness 5 of the panel or skin member 2.

Figure 16:
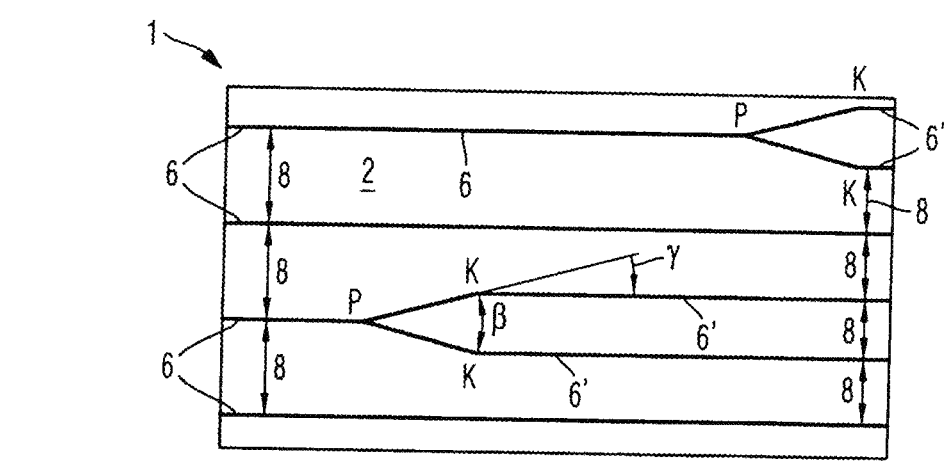
FIG. 16 is a schematic illustration of bifurcation point P, bifurcation angle β, kink K, and kink back angle γ.

The bifurcation angle β of the stiffeners 6 is usually about 60°, though this may vary, preferably within a range of ±20°. As noted above, the bifurcated branch stiffeners 6' do not continue straight at the same bifurcation angle β after the bifurcation point P. Instead, the bifurcation angle β between the branch stiffener members 6' typically decreases as the branch stiffener members 6' extend away from their respective bifurcation point P. This is apparent from FIG. 16, which shows detail of a bifurcation point P in the panel structure 1 of FIG. 15. In particular, both of the branch stiffener members 6' extends through a respective bend or a kink K of angle γ to reduce or decrease the bifurcation angle β as the branch stiffeners 6' extend away from their bifurcation point P. Thus, the branch stiffeners 6' kink back towards each other by the kink-back angle γ as shown in FIG. 16. Usually, the kink-back angle γ is half of the bifurcation angle β or smaller. This feature helps to keep the stiffener pitches 8 and buckling field size 7 generally uniform (more-or-less) over the entire panel member 2. Using bifurcated stiffeners without reducing the bifurcation angle β after bifurcation, e.g., via kink-back, results in a stiffener layout with non-uniform, varying stringer pitches as shown in FIG. 12(b).

Figure 17:
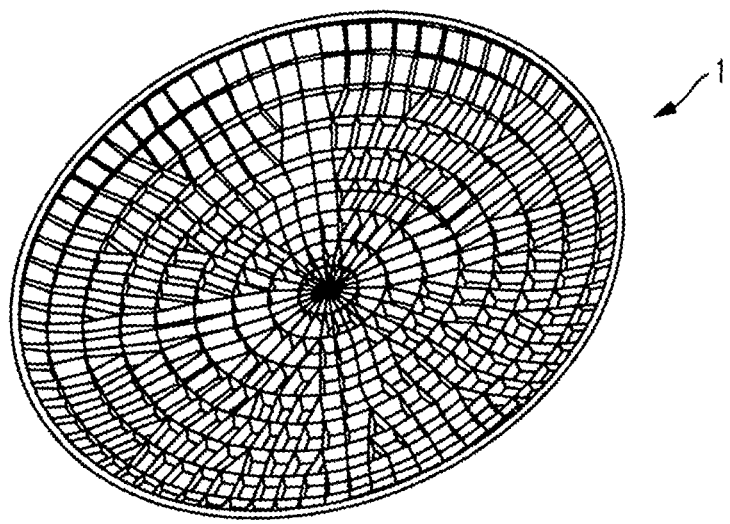
FIG. 17 shows an embodiment of a circular and spherically curved panel structure with a stiffener layout that may be used e.g., as a rear pressure bulkhead inside an aircraft fuselage.
Figure 18:
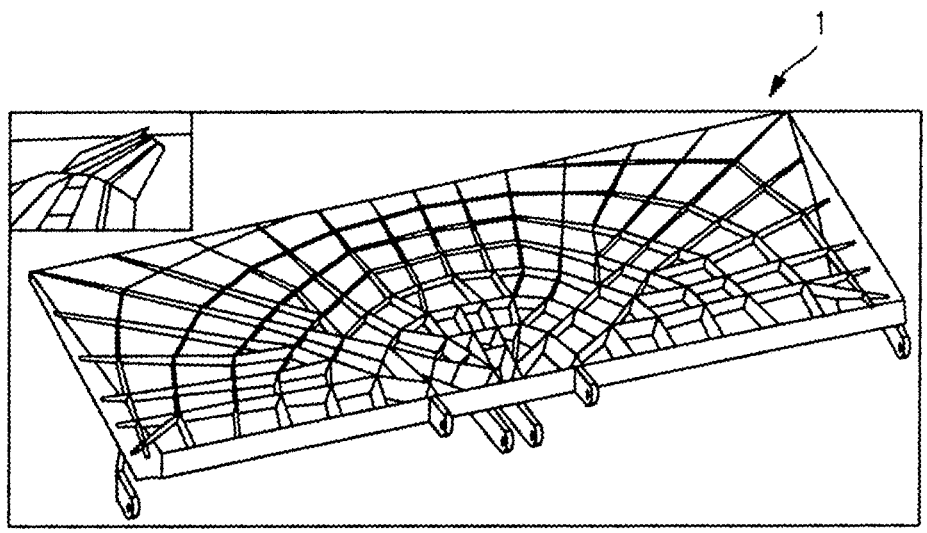
FIG. 18 is an embodiment of a rectangular panel structure according to the invention in an application as an aircraft aileron or spoiler. The top skin member is removed to show inner stiffeners with bifurcations.

FIG. 17 of the drawings shows one possible application of a panel structure 1 of the invention as a rear pressure bulk-head for location inside the stern fuselage of the aircraft (e.g., compare with FIG. 5). FIG. 18 shows another possible application of a panel structure 1 of the invention as an aileron or spoiler, which could be produced in one shot with an ALM machine. This perspective view in FIG. 18 shows the aileron or spoiler with one panel member or skin 2 removed to reveal the stiffener layout. Thus, it will be noted that the panel structure 1 of the invention can be embodied in a structural component which may, for example, comprise two or more skin members or panel members 2 which cover or enclose the plurality of stiffener members 6, 6'.

Furthermore, with reference to FIGS. 19 to 21, it will be seen that this invention may also be applied to tapered panel structures 1, which vary in width over their length. FIGS. 19 and 20 shows two examples of tapered panel structures having conventional stiffener layouts. By applying the principles of the present invention, with distributed bifurcation points P and back kinking K, the stiffener layout of the tapered panel structure 1 may be modified as shown in FIG. 21.

Although the various embodiments of the panel structures 1 described above include the stiffener members 6 attached to one side or surface 3 of the respective panel member 2, while the opposite side or surface 4 of the panel member 2 remains free of stiffeners, it will be appreciated by persons skilled in the art that, depending on the particular requirements of the structure 1, in other embodiments the stiffener members 6 may be attached to both sides 3, 4 of the panel member 2.

Figure 22:
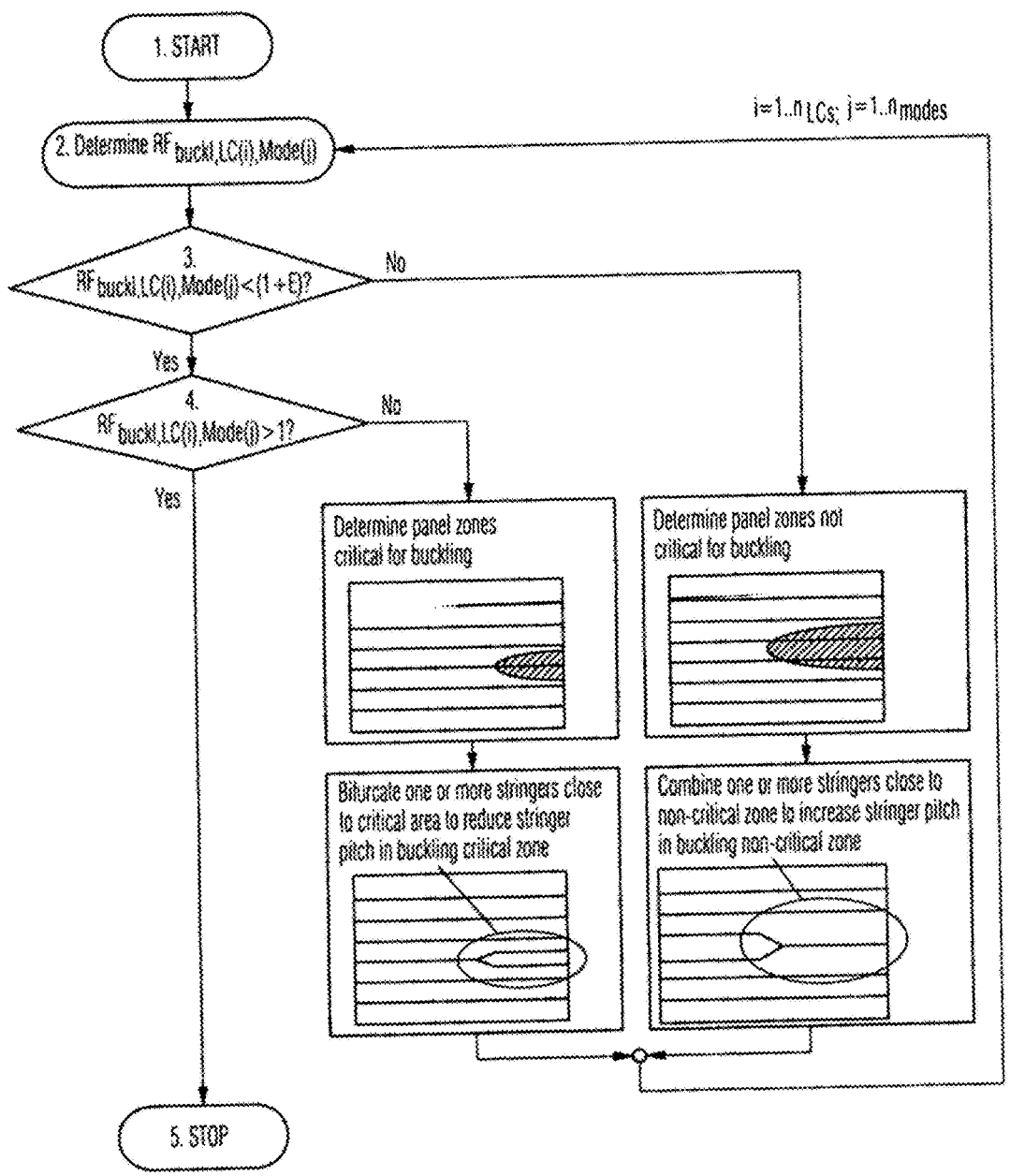
FIG. 22 is a flow chart showing an embodiment of a method of panel design according to the invention with respect to buckling and stiffener bifurcation.
Figure 23:
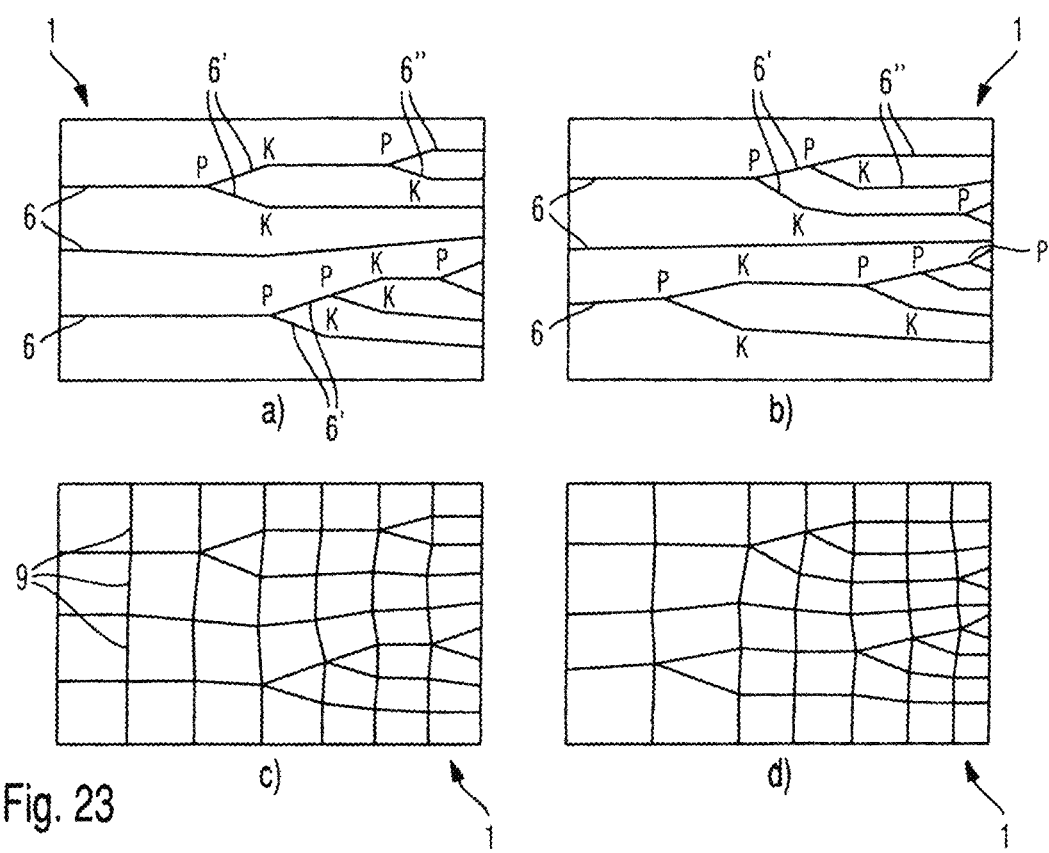
FIG. 23 shows examples of stiffener layouts for rectangular panel structures according to the invention; namely (a) a stiffener layout with stringer pitch ratio of 4:9 from left to right, (b) a stiffener layout with stringer pitch ratio of 4:11, both variants having longitudinal stiffeners only. Variants (c) and (d) have the same stringer pitch ratios as in variant (a) and (b), respectively, but include transverse stiffeners for lateral support of the longitudinal stiffeners.

A method for determining whether a stiffener member 6 of a stiffened panel structure 1 according to the invention should bifurcate or whether, on the contrary, two (branch) stiffener members 6, 6' should be combined into one, with respect to the local buckling properties of the panel member 2 is shown in principle as a flow chart in FIG. 22. It is understood by persons skilled in this field that panel buckling is only one of many criteria that a stiffened panel structure 1, e.g., for aviation or aerospace industries, needs to fulfill. Other criteria include, for example, strength and damage tolerance. Therefore, the flow chart depicted in FIG. 22 represents only one part of the overall panel sizing and design process.

The proposed process starts with a given preliminary panel design at step 1. In step 2, the reserve factors RF against buckling for each design load case LC(i) and each desired buckling mode Mode(j)·$RF_{buckl,LC(i),Mode(j)}$ will be determined. Depending on the value of $RF_{buckl,LC(i),Mode(j)}$, there may be two possibilities as to how the panel can be improved:

Firstly, if the $RF_{buckl,LC(i),Mode(j)}$ is greater than one plus a certain threshold c (see "Terminology" below for explanation) then the panel has reserves against buckling even for the most critical load case and the panel can be made lighter by increasing the stiffener pitch locally in those zones. This is done by combining two (or more) stiffeners or stringers into a single stiffener. This path is followed, when the answer to the question from step 3 is "no."

In the other case, if step 3 is answered with "yes," the next decision has to be made in step 4: If $RF_{buckl,LC(i),mode(j)}$ is smaller than 1, then the path with the answer "no" is to be followed. This means the panel 2 will start to buckle before the design load is achieved. In order to shift buckling onset to higher loads, the stiffener pitch 8 is increased locally in the affected area. This is done by bifurcating one (or more) of the stiffeners or stringers 6.

After modification of the stiffeners 6, the process is then iterated from step 2 onwards, until all $RF_{buckl,LC(i),Mode(j)}$ fall between 1 and 1+ε. The stiffened panel structure 1 is then designed with a minimum weight against buckling according to the invention.

Thus, the method preferably includes determining whether a stiffener member or stringer of the panel structure should bifurcate based on one or more of the criteria:

i) If the skin of the buckling field surrounded by the stiffener members or stringers begins to buckle before a required minimum design load, and/or ii) If the longitudinal force flux inside the stringer itself is higher than the allowable value.

On the other hand, the method may include determining whether two (or more) stiffener members or stringers of a panel structure should be combined based on the criteria:

i) If the skin of the buckling field surrounded by the stringers begins to buckle above the required minimum design load by a certain amount defined by the threshold c, and/or ii) If the longitudinal force flux inside the stringer itself is lower than the allowable value.

Figure 24:
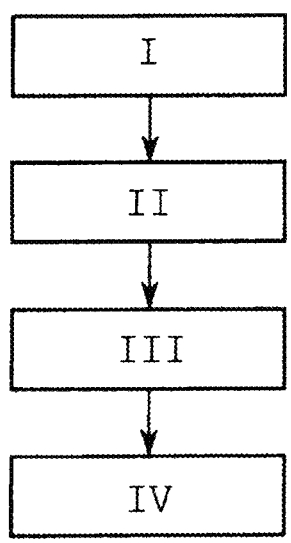
FIG. 24 is a flow chart showing an embodiment of a method of panel design according to the invention.

Finally, referring to FIG. 24 of the drawings, a flow diagram is shown that schematically illustrates the steps in a method of producing a panel structure 1 for a vehicle, especially for an aircraft A, according any one of the embodiments of the invention described above with respect to FIGS. 13 to 23. In this regard, the first box I of FIG. 24 represents the step of providing an area member 2, especially a panel member or skin member, that defines an areal expanse comprising a first surface 3 and an opposite second surface 4, with the area member 2 having a substantially constant thickness 5 between the first and second surfaces 3, 4. The second box II then represents the step of arranging a plurality of elongate stiffener members 6 extending over at least one of the first and second surfaces 3, 4 of the area member 2 for attachment to the area member 2. Then, as a subsidiary step of arranging the stiffener members 6, the third box III represents the step of dividing or bifurcating at least one of the stiffener members at a bifurcation point P into two (or more) branch stiffener members 6' in dependence on local buckling strength requirements of the area member 2. The steps represented by box II and box III of FIG. 24 may optionally be carried out in a digital modelling of the panel structure 1. The final box IV in FIG. 24 of the drawings represents the step of physically manufacturing or producing the panel structure 1 with the stiffener members 6, 6' attached to the area member 2 according to the arrangement designed in the steps represented by box II and box III. The manufacturing or production steps may comprise an Additive Layer Manufacturing (ALM) technique, such as SLM or SLS, in which the stiffener members 6, 6' are deposited and built up on and attached to the area member 2. In this regard, the area member 2 may also be deposited and built up with the ALM technique, such that a single ALM process may produce the panel structure 1 as an integral or unitary structure. Alternatively, the method may comprise other conventional manufacturing techniques, such as milling, casting, riveting, welding, and/or techniques for manufacturing composite components, such as fiber-reinforced polymer (FRP) composites, joined by bonding and/or fastening.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise," "comprising," "include," "including," "contain," "containing," "have," "having," and any variations thereof, are intended to be understood in an inclusive (i.e., non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first," "second," "third," etc. are used merely as labels, and are not intended to impose numerical requirements on or to establish a certain ranking of importance of their objects.

Terminology

ALM Additive Layer Manufacturing. This is a class of manufacturing technology, which is used to build up parts layer for layer.

b stringer pitch or width of a skin bay

ε threshold. In the context of this disclosure, the threshold c is used together with the reserve factor for buckling, $RF_{buck1}$. For practical reasons a real world stiffened panel with a number of critical load cases can normally not be designed to a condition, where the minimum reserve factor against buckling $RF_{buck1,min}$ is exactly equal to 1 over the entire panel. In order to decide whether a stiffener should bifurcate or be combined, a certain threshold above 1 is accepted. The value for ε is based on experience and is typically in the range from 0.1 to 0.5.

LC load case.

Mode mode, e.g., buckling mode.

$n_{LCs}$ number of load cases.

$n_{modes}$ number of (buckling) modes.

RF reserve factor. Measure to describe the reserves of a structure with respect to a specific strength or failure criteria. A reserve factor bigger than or equal to one (RF≥1) means the structure withstands applied loads in acceptable manner A reserve factor smaller than one (RF<1) means the structure fails to comply with the strength requirement. The reserve factor will be determined by analysis or testing.

$RF_{buck1}$ reserve factor with respect to buckling.

r radius

SLM Selective Laser Melting. A type of ALM technology which builds parts from welding microscopic powder particles together. Welding occurs very locally inside a focused laser with typically less than 0.5 mm diameter. In contrast to SLS, the powder particles with SLM will melt completely and be welded together to generate parts with very low void content and high strength and durability.

SLS Selective Laser Sintering. A type of ALM technology which builds parts from sintering microscopic powder particles together by a focused laser. As the powder particles are not completely molten as with SLM, the void content is higher and the strength is slightly reduced compared to parts made by SLM.

$\sigma_{crit}$ critical stress. In the context of this disclosure, $\sigma_{crit}$ is the stress level in the panel, when it starts to buckle.

The invention claimed is:

1. A spoiler for an aircraft, the spoiler comprising:
   a unitary body comprising:
      a skin with a first side that defines a portion of an outer surface of the aircraft and a second side opposite the first side; and
      a plurality of intersecting stiffening members extending away from the second side of the skin and forming a plurality of bays, each bay surrounded by stiffening members, and wherein at least one stiffening member comprises a bifurcation point wherein the at least one stiffening member splits into at least two stiffening members.

2. The spoiler of claim 1, wherein the unitary body is formed by an additive layer manufacturing method.

3. The spoiler of claim 1 further comprising:
   a second skin, wherein the plurality of intersecting stiffening members are disposed between the skin and the second skin.

4. The spoiler of claim 1 wherein the body has a tapering thickness.

5. The spoiler of claim 1 wherein at least a first bay from the plurality of bays is formed as a quadrilateral bay.

6. The spoiler of claim 5, wherein the quadrilateral bay is disposed along an edge of the spoiler.

7. The spoiler of claim 6 wherein the quadrilateral bay has a tapering thickness.

8. The spoiler of claim 5 wherein a second plurality of bays from the plurality of bays are each formed as a quadrilateral bay.

9. The spoiler of claim 8 wherein the quadrilateral bays are disposed along a trailing edge of the spoiler.

10. The spoiler of claim 1 wherein the plurality of intersecting stiffening members having a tapering height.

11. The spoiler of claim 1 wherein the spoiler is formed by milling.

12. An aircraft comprising:
   a fuselage and two wings, each wing comprising at least one flap and at least one spoiler, wherein the spoiler comprises a unitary body comprising:
      a skin with a first side that defines a portion of an outer surface of the aircraft and a second side opposite the first side; and
      a plurality of intersecting stiffening members extending away from the second side of the skin and forming a plurality of bays, each bay surrounded by stiffening members, and wherein at least one stiffening member comprises a bifurcation point wherein the at least one stiffening member splits into at least two stiffening members.

13. The aircraft of claim 12, wherein the unitary body is formed by an additive layer manufacturing method.

14. The aircraft of claim 12 further comprising:
   a second skin, wherein the plurality of intersecting stiffening members are disposed between the skin and the second skin.

15. The aircraft of claim 12 wherein a second plurality of bays from the plurality of bays are each formed as a quadrilateral bay.

16. The aircraft of claim 15 wherein the quadrilateral bays are disposed along a trailing edge of the spoiler.

17. The aircraft of claim 12 wherein the plurality of intersecting stiffening members having a tapering height.

18. The aircraft of claim 12 wherein the body comprises a stiffener extending along an edge of the body.

19. The aircraft of claim 12 wherein the spoiler is formed by milling.

20. A method of constructing a spoiler for an aircraft wing, the method comprising:
   forming a unitary body, wherein the unitary body has a skin with a first side that defines a portion of an outer surface of the aircraft, a second side opposite the first side, and a plurality of intersecting stiffening members extending away from the second side of the skin and forming a plurality of bays, each bay surrounded by stiffening members, and wherein at least one stiffening member comprises a bifurcation point wherein the at least one stiffening member splits into at least two stiffening members, and,
   wherein the unitary body is formed by milling.

* * * * *